Aug. 9, 1938.                    A. GOETZ                    2,126,188
                                 AIRSHIP
                          Filed Aug. 23, 1935
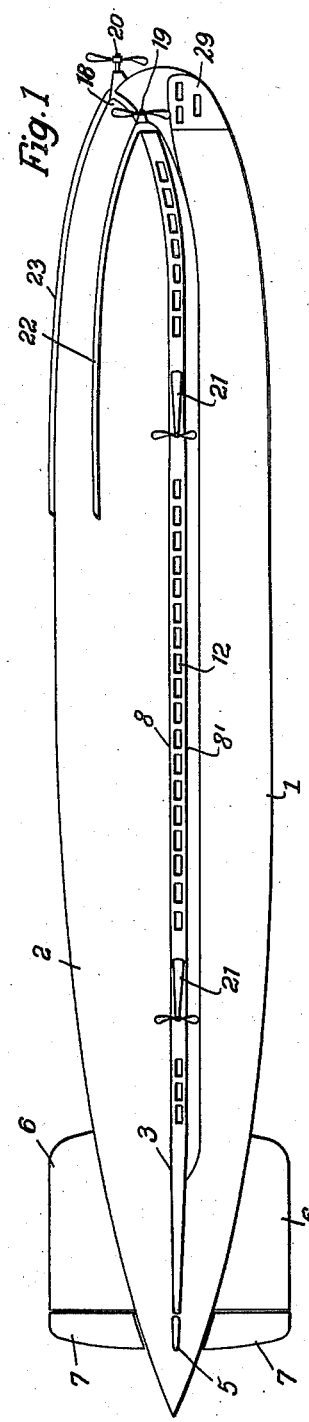
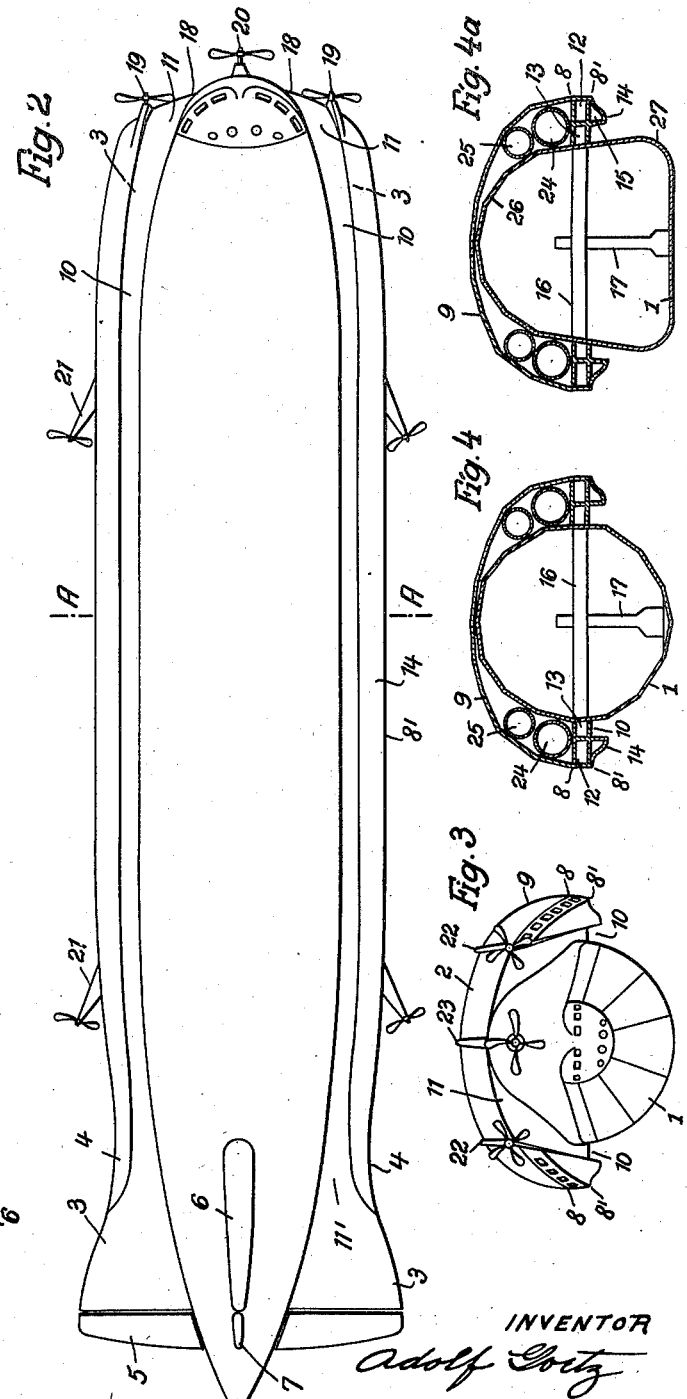
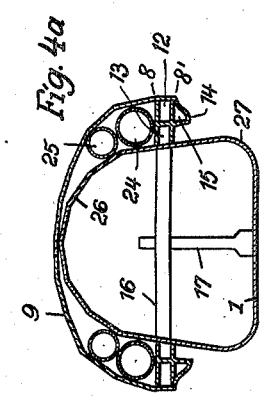
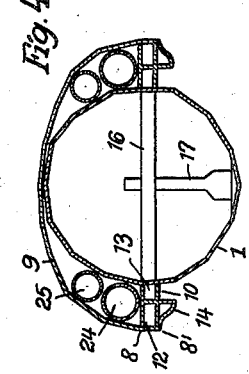
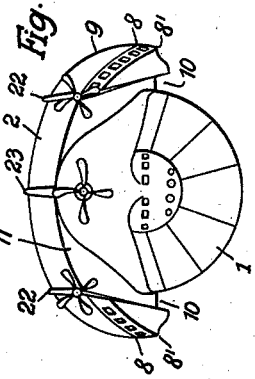
INVENTOR
Adolf Goetz
By Watson, Cort, Morse
   & Grindle
ATTYS Patented Aug. 9, 1938

2,126,188

UNITED STATES PATENT OFFICE 2,126,188

AIRSHIP

Adolf Goetz, Hamburg, Germany

Application August 23, 1935, Serial No. 37,573
In Germany September 10, 1934

8 Claims. (Cl. 244—30)

This invention of improvements in airships has for its object to construct an aircraft of great stability, increased load carrying capacity, and enhanced cruising characteristics.

It is generally recognized that safety in aircraft traffic is dependent in large measure upon the skill of the pilots. Thus, with an airship, the circumstances are otherwise than with a water-craft because the latter is already assured a sufficient degree of safety by its highly developed technical apparatus.

Now the problem of stabilizing an airship so as to conform to changing wind-conditions has hitherto not been satisfactorily solved by technical apparatus. This is obvious from the investigations of the numerous accidents. Also attempts to obtain increased carrying capacity without very substantial increase of volume have heretofore been unsuccessful.

This position having been recognized, attempts were made to improve the stabilization by providing wings on each side of the body of the airship or by going over completely to a wide flattened body which was then provided with widely projecting lateral cantilevers, in one or more steps, extending substantially the whole length of the airship. In other cases, the cylindrical shape of the airship, was still retained but air-channels were then provided instead of lateral cantilevers and these channels were either disposed within the sides of the body of the airship or below it, in the latter case also sometimes in a multi-step arrangement.

All these systems which were intended to improve simple cylindrical airships, say of the "Zeppelin" type, have, however, led to no practical result. Thus, for example, simple wings have given rise to eddy-effects. In the types with air-channels or lateral cantilevers, on the other hand, the propelling engines have been disposed under the said cantilevers or in the more or less enclosed channels, so that the air-resistance, already increased precisely by the modifications adopted, was still further increased by eddy-effects without any practical advantage having arisen therefrom in respect of carrying capacity, maneuverability or the like.

The problem of producing a high-speed airship which is materially protected against sudden air-currents and is at the same time a considerable improvement upon the known systems in respect of carrying capacity has, rather, only been solved by the present invention.

The airship of this present invention is based upon known arrangements in so far as it is provided with stabilizing surfaces which extend along both sides of its body. These stabilizing surfaces, however, constitute a longitudinal bracing system which extends through the body of the airship and at its outer parts supports cabins or has the same otherwise incorporated in it. The communication passages within the body of the airship may also be embodied in this system. The upper part of the airship, or its covering, in which is secured the lower part of the airship, commencing from the inside surface of the longitudinal bracing system, extends from one outer edge to the other of the said system, so that the lower part of the airship, so to speak, projects into the upper part of the airship, leaving a horizontal section on each of the two sides.

Both parts of the airship preferably have a stream-line shape and the proportions of the cross-sections may then be so selected that the minor radius of the semi-ellipse which can be inscribed in the cross-section of the upper part of the airship is exactly, or at least in the main, equal to the radius of the semi-circle which can be inscribed in the cross-section of the lower part of the airship, that is, in other words, the upper part and the lower part of the airship together are substantially as deep as the lower part is wide at the same plane of section. In this fashion, therefore, the cylindrical form of airship is basically retained.

In carrying the invention into effect, the outer boundary-line of the upper part of the airship is made to follow, exactly or in the main, the course of the semi-ellipse which can be inscribed in the cross-section, for the given dimensions, and the outer boundary-surface of the lower part of the airship in the same fashion the course of the semi-circle which can be inscribed in the cross-section of the said lower part under the same conditions. Furthermore, the transverse bracing system, of which the cross-section appears externally as horizontal surfaces, may rise in per se known manner towards the bows of the airship in order to ensure that the relative wind of travel flows away well under these surfaces and to counteract any nose-heaviness.

An airship with the characteristics so far described has the advantage that it rests in the air with wide horizontal surfaces on account of the cross-section selected but, nevertheless, does not need to diverge materially from the drop formation. Consequently, it combines in itself the aforesaid two advantages, the increased loading such as arises, for example, from the provision of the cabins and increased useful load being made possible by the utilization of space above the longitudinal bracing system in the upper part of the airship.

A further improvement may be effected by constructing the longitudinal bracing system, thus representing stabilizing surfaces, on both sides and as seen in cross-section in such fashion that a downwardly open wind-channel is produced at the same time, which channel extends substantially the full length of the airship. These wind-channels are preferably enclosed on three sides of their cross-section in order to conduct the air streams, flowing freely during flight, without turbulence to the outflow-end at the rear of the airship. The advantage of this arrangement in combination with the main cross-section constituted according to the invention resides in the fact that gusts incident vertically and horizontally are rendered ineffective by the movement of the air streams in the channels due to the suction exerted thereon and to the attendant change of direction of the incident wind, so that such gusts cannot therefore endanger the airship.

In order, now, that winds not incident in the direction of travel shall be conducted as satisfactorily as possible into the wind-channels, additional wind-guiding surfaces are provided leading from the underside of the upper part of the airship towards the adjacent free edges of the respective channels; the width of the wind channels may then be restricted to a fraction of the total width of the stabilizing surfaces. The wind channels preferably remain rectangular in cross-section. The wind-guiding surfaces may be made with a cross-section in the form of a flat roman S, the centre line of which points approximately towards the keel of the airship and which joins the upper covering of the airship approximately at right angles and which also runs in similar fashion into the lower wall of the air channel.

Yet a further characteristic consists in the lower body of the airship, as seen in cross-section, having bulges on each side which may extend the length of the body of the airship. These facilitate the entry of lateral winds into the wind-channels and moreover, offer the necessary conditions for providing the airship with a capacity for floating on water. For the latter purpose, the bulges need extend only over a part of the under surface of the airship.

Further advantages and features of the invention will appear from the following description, having reference to the accompanying drawing, which illustrates suitable examples, in which drawing:—

Figure 1 is the side elevation of the airship in accordance with the invention,

Figure 2 is a view from below of the same airship.

Figure 3 is the front elevation,

Figure 4 is a cross-section approximately on the line A—A of Figure 2, and

Figure 4a is a modification of the cross-section in accordance with Figure 4, the modification consisting in forming a laterally bulging lower body-part of the airship.

The airship consists of a lower part 1 of semi-circular cross-section which is incorporated in or combined with an upper part 2 of semi-elliptical cross section, a longitudinal bracing system 12, 13, 16 (cf. Figure 4) being interposed. As seen in the longitudinal direction, both parts exhibit stream-line formation. The longitudinal bracing system 12, 13, 16 appears upon both sides of the airship as stabilizing surfaces 3. These stabilizing surfaces, towards a constriction 4, at the rear of the airship, flare like fins, preferably to at least the total width of the airship. The horizontally located control surfaces 5 are then disposed in the usual manner at the rear end of the stabilizing surfaces. In addition, vertical fins 6 are provided which likewise carry vertical control surfaces 7 of the usual type.

The lateral stabilizing surfaces 3, above the upper outer edges 8 of which the upper covering 9 of the airship rises elliptically, form wind-channels running along the lower part 1 of the airship and flared in funnel-like fashion in the direction of travel due not only to the rising of the stabilizing surfaces of the front end but also to the adaptation of the front part of the airship to the inner walls of the channels. In this manner, inlets 11 for the relative wind of travel are formed. At the rear end and on the underside of the fin-like flare, say at $11^1$, the channels 10 form a gradually widening outlet. The wind-channels 10 have a substantially rectangular cross-section and the lower edge of the outer wall of each is connected by an S-shaped sweep to the lower edges $8^1$ of the upper part of the airship or of the longitudinal bracing system, wind-guiding surfaces 14 being formed which point from the edge to the keel of the airship. The space 15 formed as a consequence between these air-guiding surfaces 14 and the lower edge of the stabilizing surfaces 3 can be used for the storage of fuel or the like.

The cooling of the bottom of the wind-channels 10 by the streams set up during travel may be utilized in compressing or contracting the volume of gases. For example, individual storage ballonette-spaces specially exposed to the cooling may be accommodated not only at the front but also at the middle and rear and into these the gas discharged owing to excess pressure or take-off maneuvers may be conducted. On account of the compression or contraction which is thus produced, the same gas can be used again without loss for the refilling of main ballonettes.

By reason of the arrangement of the longitudinal bracing system, there is obtained for the first time with cylindrical airships the possibility of disposing the cabins laterally with an extraordinary saving of space. These cabins are located at 12 always in the outer part of the longitudinal bracing system. As a result of the better utilization of the lifting forces resulting from the wind-flow, it is furthermore possible to use the front of the airship for the accommodation of an engine room and for further very openly located cabins 29 for observation and airship-control purposes. Opposite the rows of cabins 12 are passages 13 which, by way of a gang-way, connect up all the rooms of the airship. This gang-way is accessible from underneath the airship by a shaft which is provided, if desired, with a lift.

The front ends 18 of the contacting lateral stabilizing surfaces 3 are adapted for the accommodation of propulsion engines 19 and also of a central driving means 20 located, if desired, somewhat more deeply, i. e. actually in the bow of the airship. Further engines 21 may be arranged within the rows of cabins in, fundamentally, any desired number, so that the new airship also obviates the disadvantage which without exception attaches to the previous free suspension of engine-gondolas on cylindrical airships. Guide-ribs 22, 23 are provided for the better guidance of the relative wind of travel thrown back from the propellers of the engines 19 and 20.

The additional loading of the airship is counterbalanced by ballonettes 24 and 25 which are accommodated in the framed-structure 26 formed between the covering 9 of the upper part of the airship and that of the lower part thereof.

Figure 4a illustrates an airship of which the lower part has lateral bulges 27 on both sides which cause the lower surface of the airship to be flattened. Since the lower surface is approximately flat, it becomes possible to alight upon water provided that the lower surface is appropriately prepared.

I claim:—

1. Airship of the lighter than air type comprising a streamlined upper part of substantially semi-elliptical cross section, a streamlined lower part of substantially semi-circular cross section, the upper part overhanging the lower part, a longitudinal bracing system occupying the overhanging parts and extending through the body of the airship, said bracing system presenting longitudinal inverted wind channels adjacent to the sides of the lower part of the ship and lateral wind guiding surfaces extending between the longitudinal outer edges of the upper portion and the adjacent edges of said channels.

2. Airship of the lighter than air type in accordance with claim 1 and having the lateral wind guiding surfaces, constructed of flat S-section, the central part of this section being directed substantially toward the keel and being joined by one bend to the covering of the upper body portion and the other bend joining the said central part with fin-like formation extending longitudinally along the respective wind channel.

3. Airship of the lighter than air type in accordance with claim 1 and having its wind channels of substantially rectangular cross section.

4. Airship of the lighter than air type in accordance with claim 1 and having its lower portion on both sides laterally bulged so as to form generally vertical side walls adapted for deflecting side wind into the longitudinally extending channels, and a generally horizontal lower surface.

5. Airship of the lighter than air type comprising a streamlined hollow upper part of substantially semi-elliptical cross section, a streamlined hollow lower part of substantially semi-circular cross section, the upper part overhanging the lower part, a longitudinal bracing system occupying the overhanging parts and extending through the body of the airship, said bracing system presenting longitudinal inverted wind channels extending along the body of the lateral spaces formed by the overhanging of the top, and outwardly flared surfaces at the front end of the channels adapted for promoting entry of the wind into said channels, the overhanging upper part of the airship merging into the usual lateral fin-like stabilizing surfaces at the rear of the ship to at least the total width of the body of the ship, said wind channels at this portion of the ship flaring and finally disappearing adjacent said surfaces.

6. Airship of the lighter than air type comprising a streamlined upper part of substantially semi-elliptical cross section, a streamlined lower part of substantially semi-circular cross section, the upper part overhanging the lower part, a longitudinal bracing system occupying the overhanging parts and extending through the body of the airship, and inverted wind channels of substantially rectangular cross section and extending longitudinally in the lateral spaces formed by the overhanging parts.

7. Airship of the lighter than air type comprising a streamlined upper part of substantially semi-elliptical cross section, a streamlined lower part somewhat narrower than said upper part and depending therefrom, the upper part overhanging the lower part, a longitudinal bracing system occupying the overhanging parts and extending through the body of the airship, and inverted wind channels extending longitudinally in the lateral spaces formed by the overhanging parts, said lower portion on both sides being laterally bulged so as to form substantially vertical side walls adapted for deflecting side wind into the longitudinally extending channels, and having a generally horizontal lower surface.

8. Airship of the lighter than air type, comprising an elongated streamlined upper part of substantially semi-elliptical transverse cross section, an elongated streamlined lower part of substantially semi-circular transverse cross section, the lower portion of said upper part being wider than said lower part so as to overhang the latter at both sides of the craft and for approximately the entire length thereof, a horizontal wall structure connecting the lower portion of the upper part and the upper portion of the lower part on each side of the ship, a substantially vertical downward extension along the margins of said upper part disposed outwardly of and substantially parallel to the walls of the upper portion of the lower part, whereby an elongated longitudinally extending, downwardly opening wind channel is formed on each side of the airship, each of said channels being enclosed on three sides by the wall of the upper portion of the lower part, said horizontal wall, and said downward extensions of the upper part respectively.

ADOLF GOETZ.